(12) United States Patent
Troitino Lopez et al.

(10) Patent No.: US 11,148,331 B2
(45) Date of Patent: Oct. 19, 2021

(54) MOLD SYSTEM INCLUDING SEPARABLE, VARIABLE MOLD PORTIONS FOR FORMING CASTING ARTICLE FOR INVESTMENT CASTING

(71) Applicant: General Electric Company, Schenectady, NY (US)

(72) Inventors: Jose Troitino Lopez, Greenville, SC (US); Eric Lee Bell, Simpsonville, SC (US); Jeffrey Clarence Jones, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 319 days.

(21) Appl. No.: 15/728,890

(22) Filed: Oct. 10, 2017

(65) Prior Publication Data

US 2019/0105822 A1    Apr. 11, 2019

(51) Int. Cl.
*B29C 45/26*      (2006.01)
*B22C 9/10*       (2006.01)
(Continued)

(52) U.S. Cl.
CPC .............. *B29C 45/26* (2013.01); *B22C 7/02* (2013.01); *B22C 9/10* (2013.01); *B29C 45/14* (2013.01);
(Continued)

(58) Field of Classification Search
CPC .... B22C 9/00; B22C 9/10; B22C 7/02; B22C 9/24; B29C 45/26; B33Y 80/00
See application file for complete search history.

(56) References Cited

U.S. PATENT DOCUMENTS 3,482,815 A  *  12/1969  Naturale ............. B29C 45/4421
                                                                 249/180
5,275,547 A     1/1994  Brown
(Continued)

FOREIGN PATENT DOCUMENTS

JP              61126943 A  *  6/1986  ............. B22C 21/14
WO           2016089368 A1     6/2016
WO    WO-2016089368 A1  *  6/2016  ............... B22C 9/02

OTHER PUBLICATIONS

U.S. Appl. No. 15/728,920 Notice of Allowance dated Feb. 13, 2019, 12 pages.

(Continued)

*Primary Examiner* — Timothy Kennedy
*Assistant Examiner* — Farah Taufiq
(74) *Attorney, Agent, or Firm* — James Pemrick; Hoffman Warnick LLC (57) ABSTRACT

A mold system and method for forming a casting article for investment casting is disclosed. The mold system includes a mold for receiving therein a selected core chosen from a plurality of varied cores. The mold includes a plurality of separable mold portions that are coupleable together to create the mold and configured to form a sacrificial material from a sacrificial material fluid about the selected core. At least one selected separable mold portion of the plurality of separable mold portions includes a set of varied interchangeable versions of the at least one selected separable mold portion. Each varied interchangeable version of the selected separable mold portion is configured to accommodate a different core of the plurality of varied cores. A number of systems for controlling a temperature of the mold are also disclosed.

10 Claims, 9 Drawing Sheets

(51) Int. Cl.
  *B29C 45/14* (2006.01)
  *B33Y 80/00* (2015.01)
  *B22C 7/02* (2006.01)
  *B29C 45/78* (2006.01)
  *B29L 31/00* (2006.01)

(52) U.S. Cl.
  CPC .............. *B29C 45/78* (2013.01); *B33Y 80/00* (2014.12); *B29C 2945/76531* (2013.01); *B29L 2031/757* (2013.01)

(56) References Cited

U.S. PATENT DOCUMENTS

| | | |
|---|---|---|
| 5,849,238 A | 12/1998 | Schmidt et al. |
| 7,100,672 B2 | 9/2006 | Park |
| 7,469,739 B2 | 12/2008 | Otero et al. |
| 7,913,743 B2 | 3/2011 | Bedzyk |
| 8,393,381 B2 | 3/2013 | Graham et al. |
| 8,561,668 B2 | 10/2013 | Castle et al. |
| 8,915,289 B2 | 12/2014 | Mueller et al. |
| 9,387,533 B1 | 7/2016 | Heneveld et al. |
| 9,738,012 B2 * | 8/2017 | Ulemek ............... B29C 33/3842 |
| 2003/0015308 A1 * | 1/2003 | Fosaaen ................ B22C 9/065 164/35 |
| 2004/0231822 A1 | 11/2004 | Frasier et al. |
| 2007/0063378 A1 | 3/2007 | O'Donoghue |
| 2013/0220572 A1 * | 8/2013 | Rocco ................... B29C 33/04 164/520 |
| 2013/0224327 A1 | 8/2013 | Altonen et al. |
| 2013/0333855 A1 | 12/2013 | Merrill et al. |
| 2013/0333950 A1 | 12/2013 | Atkins et al. |
| 2016/0001354 A1 | 1/2016 | Pinero et al. |
| 2016/0121389 A1 | 5/2016 | Slavens et al. |
| 2016/0346831 A1 | 12/2016 | Snyder et al. |
| 2017/0028460 A1 | 2/2017 | Toda et al. |
| 2017/0087631 A1 | 3/2017 | Gold |

OTHER PUBLICATIONS

U.S. Appl. No. 15/728,900, Office Action dated Dec. 2, 2019, 16 pgs.

U.S. Appl. No. 15/728,900, Notice of Allowance dated Jan. 2, 2020, 5 pgs.

U.S. Appl. No. 16/274,679, Office Action dated Jan. 10, 2020, 17 pgs.

U.S. Appl. No. 15/728,881 Office Action dated Jul. 31, 2020, 12 pages.

U.S. Appl. No. 15/728,881, Notice of Allowance dated Mar. 15, 2021, 12 pages.

* cited by examiner

MOLD SYSTEM INCLUDING SEPARABLE, VARIABLE MOLD PORTIONS FOR FORMING CASTING ARTICLE FOR INVESTMENT CASTING

The application is related to U.S. Pat. Nos. 10,252,325, 10,618,104, and 11,027,469.

BACKGROUND OF THE INVENTION

The disclosure relates generally to inserts for investment casting, and more particularly, to a mold system for forming a casting article for investment casting.

Investment casting is used to manufacture a large variety of industrial parts such as turbomachine blades. Investment casting uses a casting article having a sacrificial material pattern to form a ceramic mold for the investment casting. Certain types of casting articles may include a core or insert within the sacrificial material pattern. The core defines an interior structure of the component and becomes a part of the ceramic mold used during the investment casting. The core can include a large variety of intricate features that define an interior structure of the component. Cores can be additively manufactured to allow for rapid prototyping and manufacturing of the cores. The casting article is made by molding a sacrificial material fluid, such as hot wax or a polymer, about the core in a mold that defines the shape of the component surrounding the core. The hardened sacrificial material formed about the core defines the shape of the component for the investment casting.

Each casting article, either individually or in a collection thereof, can be dipped in a slurry and coated with a ceramic to form a ceramic mold for the investment casting. Once the sacrificial material is removed from the ceramic mold, the mold can be used to investment cast the component using a molten metal, e.g., after pre-heating the ceramic mold. Once the molten metal has hardened, the ceramic mold can be removed, and the core can be removed using a leachant. The component can then be finished in a conventional fashion, e.g., heat treating and conventional finishing.

Investment casting is a time consuming and expensive process, especially where the component must be manufactured to precise dimensions. In particular, where precise dimensions are required, formation of the casting article must be very precise. Each mold used to form the casting article can be very costly, and can take an extensive amount of time to manufacture. Consequently, any changes in the core or the component can be very expensive and very time consuming to address. Other challenges that can be costly and time consuming to address are unforeseen weaknesses in the core that cause it to crack or break either during formation of the casting article (e.g., during casting of the sacrificial material about the core), or during the actual investment casting. For example, high pressure sacrificial fluid injected into a mold about the core during casting article formation can crack or break the core, or molten metal injected during the investment casting can crack or break the core. In the former case, the core must be adjusted, and in the latter case, the core and/or the casting article mold may need adjusting. In any event, the changes are costly and time consuming. Currently, there is no mechanism to proactively address the core cracking/breaking challenges.

One approach to reduce time and costs employs additive manufacture of the cores and molds for making the casting article. In particular, additive manufacture allows for more rapid turnaround for design changes in cores and/or the component leading up to the component manufacturing steps. Additive manufacturing (AM) includes a wide variety of processes of producing an object through the successive layering of material rather than the removal of material. Additive manufacturing can create complex geometries without the use of any sort of tools, molds or fixtures, and with little or no waste material. Instead of machining objects from solid billets of material, much of which is cut away and discarded, the only material used in additive manufacturing is what is required to shape the object. Current categories of additive manufacturing may include: binder jetting, material extrusion, powder bed infusion, directed energy deposition, sheet lamination and vat photopolymerization.

Additive manufacturing techniques typically include taking a three-dimensional (3D) computer aided design (CAD) file of the object (e.g., core and/or casting article mold) to be formed, electronically slicing the object into layers (e.g., 18-102 micrometers thick) to create a file with a two-dimensional image of each layer (including vectors, images or coordinates) that can be used to manufacture the object. The 3D CAD file can be created in any known fashion, e.g., computer aided design (CAD) system, a 3D scanner, or digital photography and photogrammetry software. The 3D CAD file may undergo any necessary repair to address errors (e.g., holes, etc.) therein, and may have any CAD format such as a Standard Tessellation Language (STL) file. The 3D CAD file may then be processed by a preparation software system (sometimes referred to as a "slicer") that interprets the 3D CAD file and electronically slices it such that the object can be built by different types of additive manufacturing systems. The object code file can be any format capable of being used by the desired AM system. For example, the object code file may be an STL file or an additive manufacturing file (AMF), the latter of which is an international standard that is an extensible markup-language (XML) based format designed to allow any CAD software to describe the shape and composition of any three-dimensional object to be fabricated on any AM printer. Depending on the type of additive manufacturing used, material layers are selectively dispensed, sintered, formed, deposited, etc., to create the object per the object code file.

One form of powder bed infusion (referred to herein as metal powder additive manufacturing) may include direct metal laser melting (DMLM) (also referred to as selective laser melting (SLM)). This process is advantageous for forming metal molds for forming casting articles. In metal powder additive manufacturing, metal powder layers are sequentially melted together to form the object. More specifically, fine metal powder layers are sequentially melted after being uniformly distributed using an applicator on a metal powder bed. Each applicator includes an applicator element in the form of a lip, brush, blade or roller made of metal, plastic, ceramic, carbon fibers or rubber that spreads the metal powder evenly over the build platform. The metal powder bed can be moved in a vertical axis. The process takes place in a processing chamber having a precisely controlled atmosphere. Once each layer is created, each two dimensional slice of the object geometry can be fused by selectively melting the metal powder. The melting may be performed by a high powered irradiation beam, such as a 100 Watt ytterbium laser, to fully weld (melt) the metal powder to form a solid metal. The irradiation beam moves or is deflected in the X-Y direction, and has an intensity sufficient to fully weld (melt) the metal powder to form a solid metal. The metal powder bed may be lowered for each subsequent two dimensional layer, and the process repeats until the object is completely formed. In order to create certain larger objects faster, some metal additive manufacturing systems employ a pair of high powered lasers that work together to form an object, like a mold. Other additive manufacturing processes, such as 3D printing, may form layers by dispensing material in layers.

Although additive manufacturing of cores and/or molds for casting article formation has reduced time and cost for adjusting cores and/or molds, challenges remain. Most notably, current mold systems and practices for forming a casting article form one mold regardless of variations in cores. When variations in cores are subtle or when the core has fine or intricate features, it can result in cracked or broken cores and/or imprecise casting articles. Where variations in cores are more profound, e.g., where they share a common structure but also have other structure that varies widely to build different components, each variation of core must have its own mold. Current mold systems used for forming the casting articles are also not sufficiently thermally adjustable to accommodate sacrificial material fluid flow across different cores.

Another challenge with current investment casting is ensuring cores within a casting article can withstand the actual investment casting, i.e., the casting of a molten metal about the core. The current practice includes a trial and error approach in which a casting article is used to perform an investment casting to determine its efficacy. During investment casting, the core may, for example, break, crack or prevent adequate molten metal flow to form the component. In the absence of any mechanism to predict core efficacy, when a problem is identified during investment casting, changes to the core, the metal casting article mold, and/or the casting article formation process must be made, all of which are time consuming and expensive.

BRIEF DESCRIPTION OF THE INVENTION

A first aspect of the disclosure provides a mold system for forming a casting article for investment casting, the mold system comprising: a mold for receiving therein a selected core chosen from a plurality of varied cores, the mold including a plurality of separable mold portions that are coupleable together to create the mold and configured to form a sacrificial material from a sacrificial material fluid about the selected core, wherein at least one selected separable mold portion of the plurality of separable mold portions includes a set of varied interchangeable versions of the at least one selected separable mold portion, each varied interchangeable version of the selected separable mold portion configured to accommodate a different core of the plurality of varied cores.

A second aspect of the disclosure provides a method of forming a casting article for investment casting, the casting article including a sacrificial material about a core, the method comprising: having a plurality of separable mold portions for a mold for forming the casting article additively manufactured, the plurality of mold portions including a set of varied interchangeable versions of a selected separable mold portion, each varied interchangeable version of the selected separable mold portion configured to accommodate a different core of a plurality of varied cores; forming the mold about a selected core of the plurality of varied cores by coupling two or more mold-selected separable mold portions together, the mold-selected separable mold portions selected to accommodate the selected core of the plurality of varied cores; and casting the casting article by introducing a sacrificial material fluid into the mold and about the selected core.

A third aspect may include a mold system for forming a casting article for investment casting, the mold system comprising: a mold for receiving therein a core, the mold including a plurality of sacrificial material fluid input zones configured to receive a sacrificial material fluid to form a sacrificial material about the core; and a sacrificial material heating system configured to heat a plurality of flows of the sacrificial material fluid to different temperatures, wherein one sacrificial material fluid input zone receives one of the plurality of flows of the sacrificial material fluid at a first temperature and another sacrificial material fluid input zone receives another of the plurality of flows of the sacrificial material fluid at a second, different temperature.

A fourth aspect includes a mold system for forming a casting article for investment casting, the mold system comprising: a mold for receiving therein a core, the mold including a plurality of separable mold portions that are coupleable together to create the mold and configured to form a sacrificial material from a sacrificial material fluid about the core, wherein each separable mold portion includes a mold thermal conducting conduit therein configured to pass a temperature controlled thermal fluid therethrough to control a temperature of at least the sacrificial material fluid within the respective separable mold portion; and a thermal fluid controller controlling a temperature of the temperature controlled thermal fluid passing through each of the plurality of separable mold portions, at least one separable mold portion having the temperature controlled thermal fluid passing therethrough having a temperature different than another separable mold portion.

A fifth aspect includes a method of forming a casting article for investment casting, the casting article including a sacrificial material about a core, the method comprising: controlling a temperature of a plurality of sacrificial material fluid input zones in a mold configured to receive a sacrificial material fluid to form a sacrificial material about the core that is positioned within the mold; and forming the casting article by introducing a sacrificial material fluid into the mold and about the selected core.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure provides a mold system including a mold for receiving therein a selected core chosen from a plurality of varied cores. The mold is configured to form a sacrificial material from a sacrificial material fluid, e.g., wax or a polymer, about a selected core to create a casting article. The casting article including the core and hardened sacrificial fluid material thereabout are used in a conventional manner to form a ceramic mold used for subsequent investment casting of a component. The varied cores may differ in any number of ways such as shape, dimensions, contours, material properties, etc. In one example, each varied core can be close in shape, but have some dimensional variance. In another example, part of a casting article mold may be employed to form a number of components that share a common, first internal structure formed by a common core, but include a number of different, second internal structures formed by a second, different core. That is, the common, first internal structure may be formed by a first, common core, while the different, second internal structures may be made by various second cores. The cores may be made from ceramic or other refractory material (e.g., niobium, molybdenum, tantalum, tungsten or rhenium), metal, metal alloy or combinations thereof.

In order to address the challenge of varied cores, a mold according to embodiments of the disclosure includes a plurality of separable mold portions that are coupleable together to create the mold. In contrast to conventional mold systems, at least one selected separable mold portion of the plurality of separable mold portions includes a set of varied interchangeable versions of the at least one selected separable mold portion. Each varied interchangeable version of the selected separable mold portion is configured to accommodate a different core of the plurality of varied cores. In this fashion, variations in cores, whether simple dimensional differences or widely different internal structures to create different components, can be readily accommodated without forming a complete, expensive metal mold for each core variation. Embodiments of the disclosure also leverage the separable mold portions to provide precise temperature control across the mold to address a number of issues such as certain core areas being prone to cracking or breaking.

Figure 1:
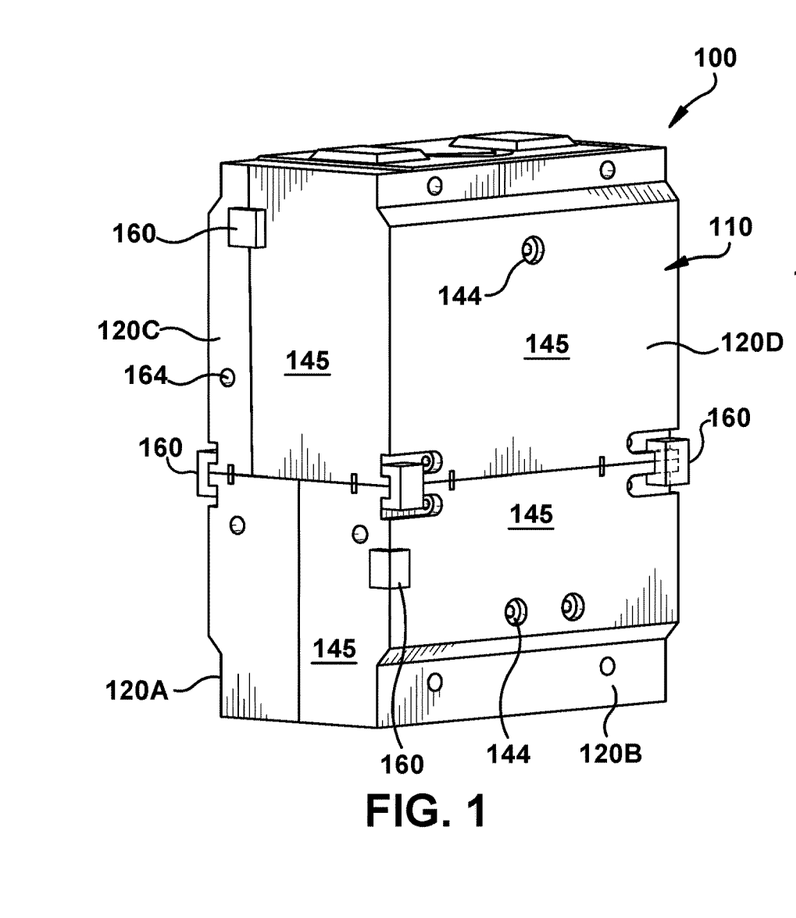
FIG. 1 shows a perspective front view of a mold system according to embodiments of the disclosure.
Figure 2:
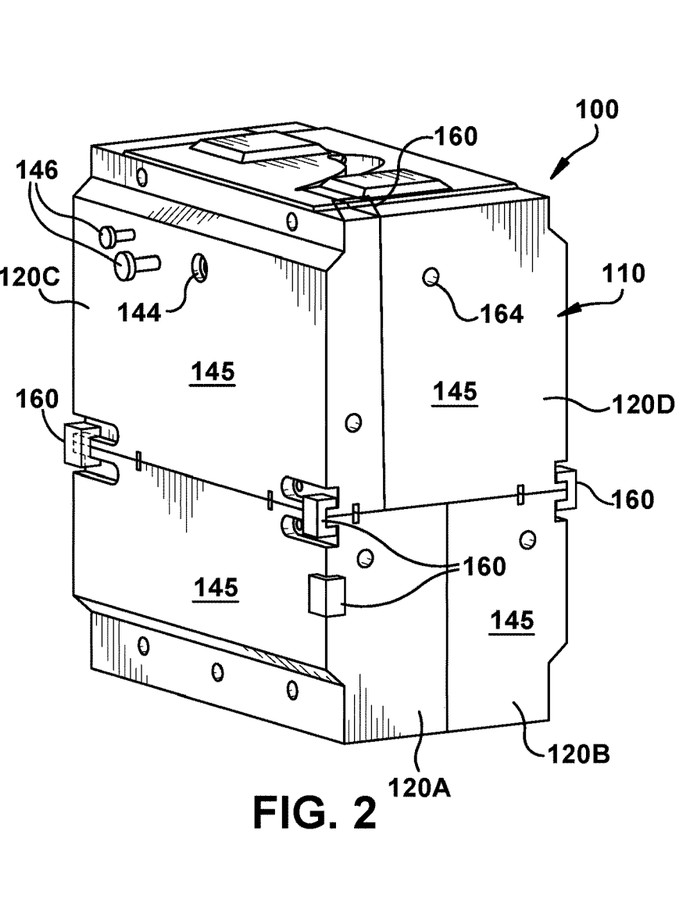
FIG. 2 shows a perspective rear view of a mold system according to embodiments of the disclosure.
Figure 3:
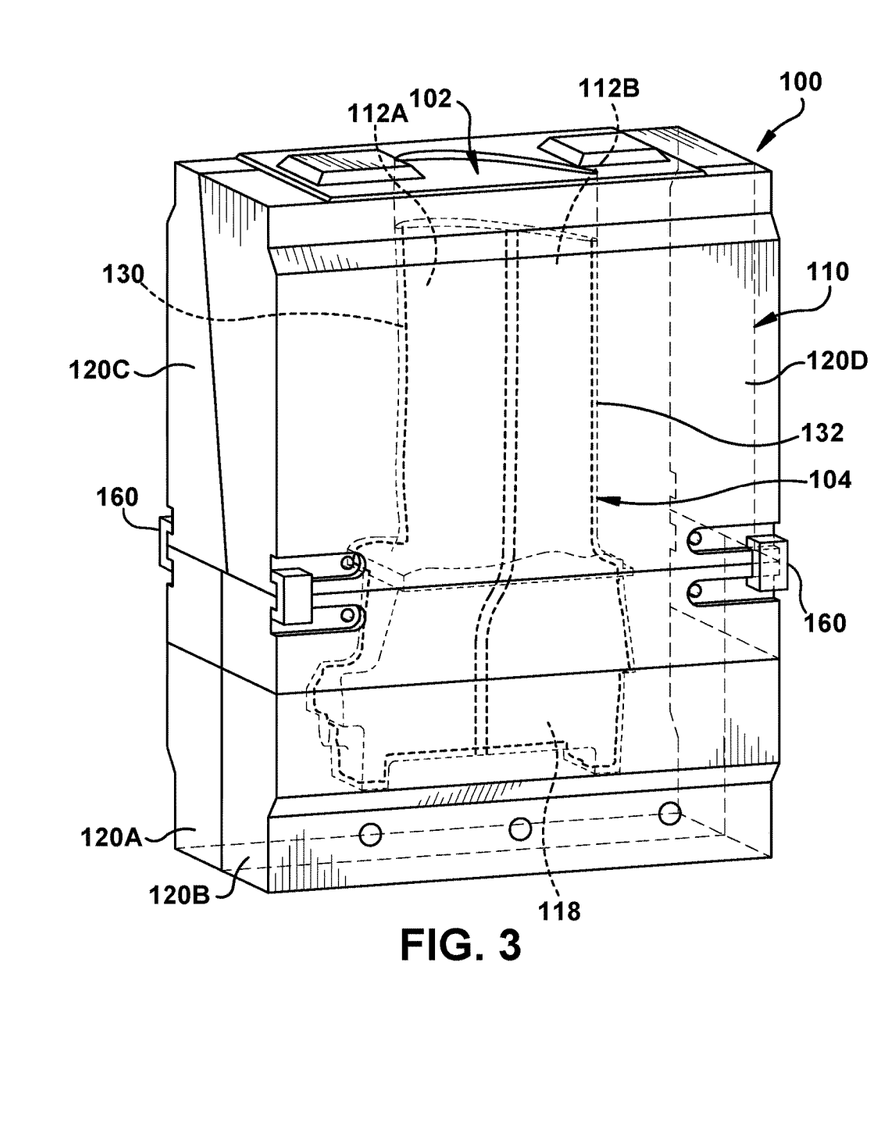
FIG. 3 shows a front, see-through perspective view of the mold system according to embodiments of the disclosure.
Figure 4:
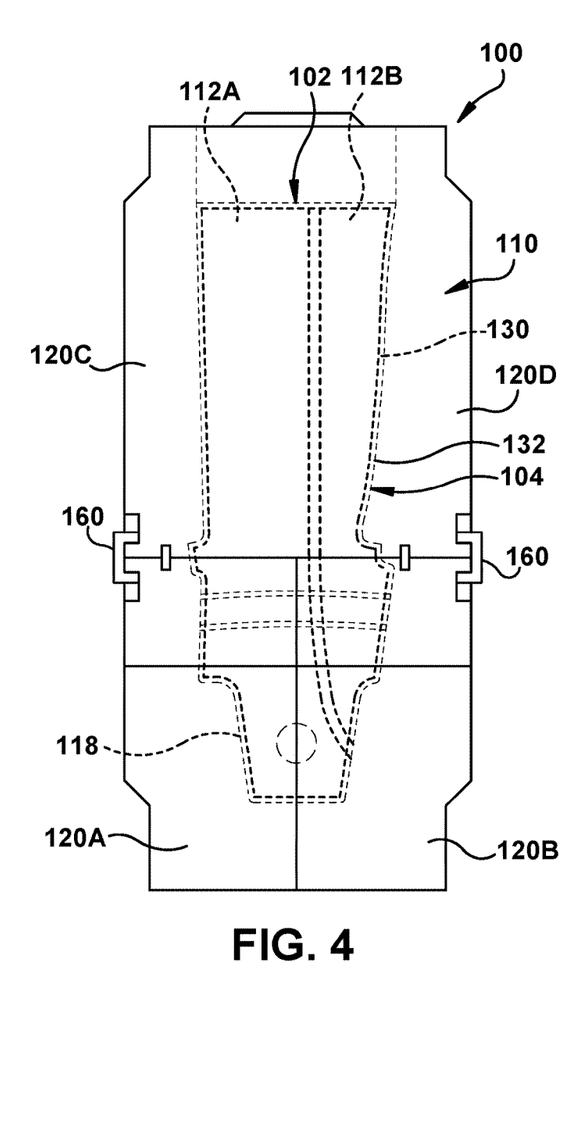
FIG. 4 shows a side, see-through perspective view of the mold system according to embodiments of the disclosure.

Referring to FIGS. 1 and 2, a front perspective view and a rear perspective view, respectively, of a mold system 100 according to embodiments of the disclosure are illustrated. Further, FIG. 3 shows a front, see-through perspective view, and FIG. 4 shows a side, see-through perspective view of mold system 100 from FIGS. 1-2. It is appreciated that according to embodiments of the disclosure, mold system 100 is used for forming a casting article 102 (FIGS. 3-4) for investment casting. For purposes of description, as shown in FIGS. 3-4, the disclosure shows the component to be built as a turbomachine airfoil 104. It will be readily understood that the teachings of the disclosure are applicable to any component capable of investment casting and which is to include an internal structure formed by a core.

Figure 5:
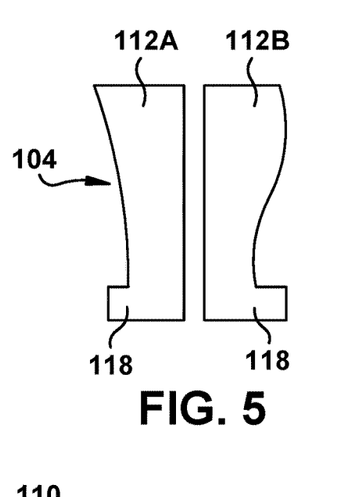
FIGS. 5-7 show schematic side views of illustrative varied cores.
Figure 6:
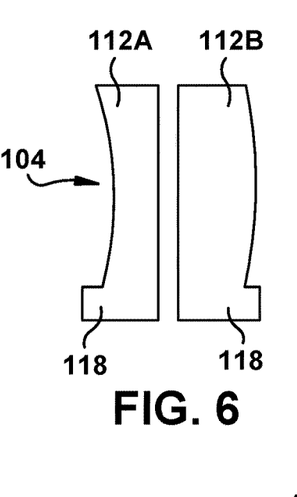
Figure 7:
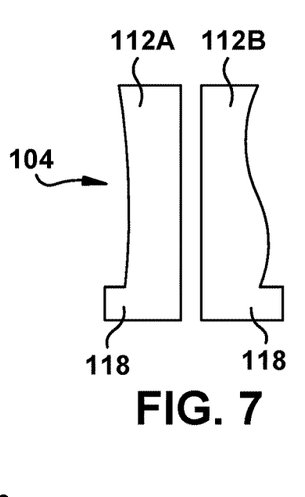

Mold system 100 includes a mold 110 for receiving therein a selected core chosen from a plurality of varied cores. The variation in cores can take any of a large number of forms. In the example shown in FIGS. 3 and 4, two different cores 112A, 112B (collectively "cores 112") are illustrated that collectively form an internal structure in the turbomachine airfoil, e.g., cooling channels, support structure, etc. In the turbomachine airfoil example, a core 112A may form a portion including a leading edge of the airfoil, while core 112B forms a portion including a trailing edge of the airfoil. In one non-limiting example, a number of different turbomachine airfoils can be formed by using a single leading edge core 112A, and a variety of different, trailing edge cores 112B. FIGS. 5-7 show schematic side views of a number of examples in which single leading edge core 112A is used, and a variety of differently shaped cores 112B are employed. It is recognized that the portion of the component that changes can also differ from component to component, e.g., for an airfoil, the leading edge or a root portion 118 may also vary.

Figure 8:
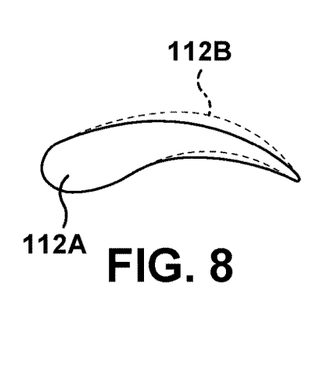
FIG. 8 show a schematic top view of illustrative overlaid varied cores.

FIG. 8, in contrast to FIGS. 5-7, shows a top view of varied cores 112A, 112B in which the difference is simply a dimensional or shape variation created by variation during core manufacture, e.g., via additive manufacturing. In this setting, variations from core to core can be identified in any now known or later developed fashion such as but not limited to: blue light scans or point cloud scans. The differences identified can be used to generate a model of the actual cores 112A, 112B, which can then be used to adjust mold 110 accordingly, e.g., to maintain a desired spacing between and interior surface 132 of mold 110 and core 112 to ensure proper positioning and thickness of sacrificial material 130. Modifications to mold 110 can be made during manufacturing of the mold (e.g., using additive manufacturing and/or computer aided design software systems), and in particular, separable mold portions 120 that form the mold. Core 112 can be formed in any now known or later developed fashion. In one embodiment, core 112 is formed by additive manufacturing, e.g., 3D printing.

Mold 110 includes a plurality of separable mold portions 120A-D (collectively "separable mold portions 120") that are coupleable together to create the mold. As shown in FIGS. 1-4, four mold portions 120A-D are provided in the example shown. It is understood however that any number of separable mold portions 120 may be employed, e.g., two or more. As understood, mold 110 is configured to form sacrificial material 130 from a sacrificial material fluid (i.e., sacrificial material in a fluid form) about a selected core 112. Core 112 is positioned within mold 110 and is spaced from interior surface 132 of mold 110 such that sacrificial material fluid can readily flow between core 112 and the interior surface of the mold to create casting article 102. The sacrificial material can be any now known or later developed material that is capable of injecting in a fluid form, and that is sufficiently rigid in a solid state to hold its shape during investment casting ceramic mold formation. Sacrificial material may include but is not limited to: wax or polymer.

Figure 9:
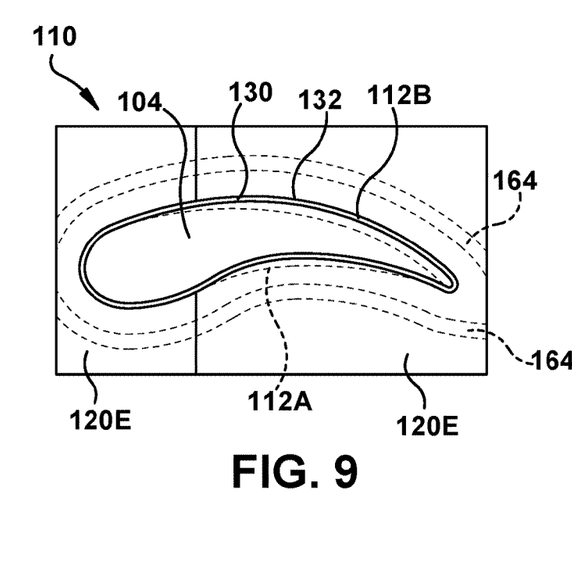
FIG. 9 shows a cross-sectional top view of a first core in a mold system including separable mold portions according to embodiments of the disclosure.
Figure 10:
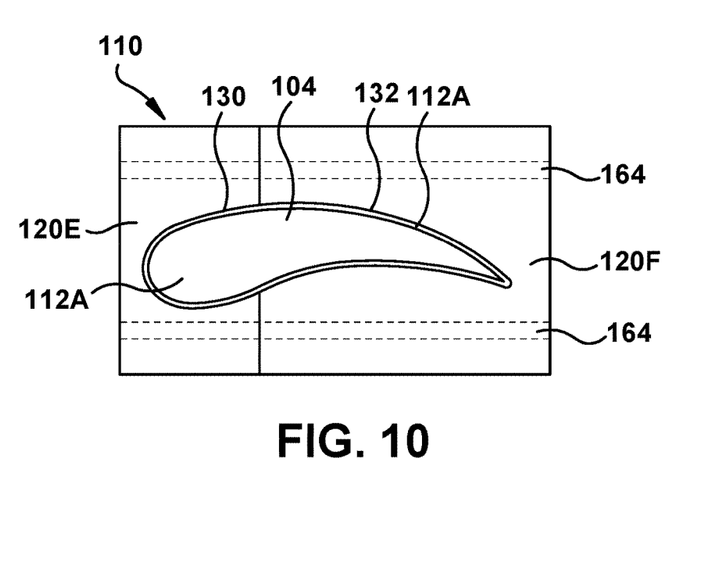
FIG. 10 shows a cross-sectional top view of a second, different core from that of FIG. 9 in a mold system including different separable mold portions according to embodiments of the disclosure.

As shown in FIGS. 9 and 10, any selected separable mold portion 120 of plurality of separable mold portions 120A-D in a particular mold can include a set of varied interchangeable versions thereof. In the example shown, a set of separable mold portions 120E (FIG. 9) and 120F (FIG. 10) are provided for a portion including a trailing edge of a turbomachine airfoil 104. While two varied interchangeable versions are shown, any number may be employed to accommodate any number of varied cores 112, e.g., sets with many similar mold portions can be made. Each varied interchangeable version 120E, 120F of the selected separable mold portion 120 may be configured to accommodate a different core 112 of the plurality of varied cores 112. In the example shown in FIG. 9, a separable mold portion 120E is shaped to accommodate core 112B, while as shown in FIG. 10, separable mold portion 120F is shaped to accommodate different core 112A in the same position of mold 110. Each varied interchangeable version of a selected separable mold portion 120 can be different in a number of ways such as but not limited to: mold opening shape, size: length, width, height; thermal cooling circuit (presence or path, described elsewhere herein); coefficient of thermal expansion; coefficient of heat transfer; material and/or material properties such as yield strength, grain boundary structure, surface finish, etc. In any event, selected separable mold portions 120E, 120F are configured to be positioned in the same position within mold 110 to complete the mold, but have different interior surfaces 132 to accommodate varied cores 112A, 112B. As will be described herein, separable mold portions 120E, 120F may include a number of other features that allow for, among other things, proper coupling and thermal control.

Each separable mold portion 120 may include a metal alloy, an acrylic based material such as but not limited to poly-methyl methylacrylate (PMMA), or a material having glass transition temperature above 70° C. (approximately 160° F.). Where a metal alloy is employed, separable mold portions 120 can be readily manufactured with the aforementioned customized structure using, for example, additive manufacturing. More particularly, a metal powder additive manufacturing process may be used to form metal separable mold portions 120. Metal powder additive manufacturing may include, for example, direct metal laser melting (DMLM). It is understood that the general teachings of the disclosure are equally applicable to other forms of metal powder additive manufacturing such as but not limited to direct metal laser sintering (DMLS), selective laser sintering (SLS), electron beam melting (EBM), and perhaps other forms of additive manufacturing. Where separable mold portions 120 include an acrylic-based material or material with glass transition temperature above 70° C., mold portions 120 can be manufactured by, for example, stereolithography or 3D printing (e.g., using stereolithography resins). Other processes may also be employed to manufacture separable mold portions 120, e.g., casting and machining.

Figure 11:
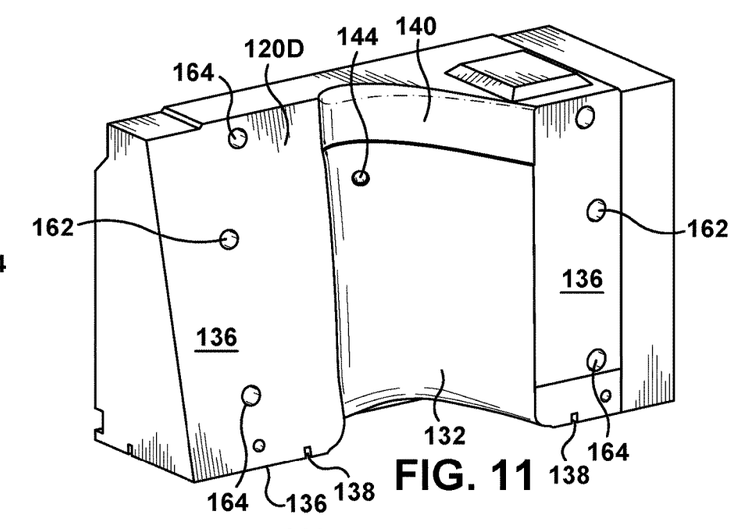
FIG. 11-14 show varied views of a pair of separable mold portions of a mold system according to embodiments of the disclosure.
Figure 12:
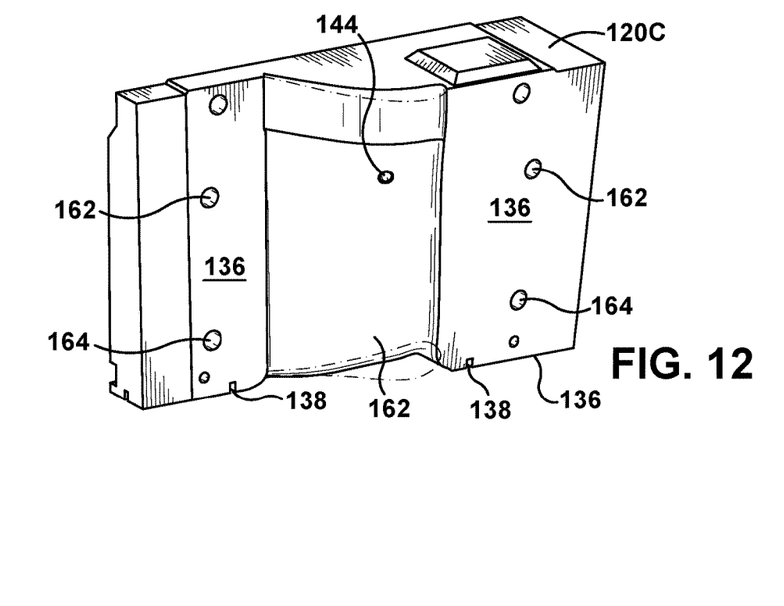
Figure 13:
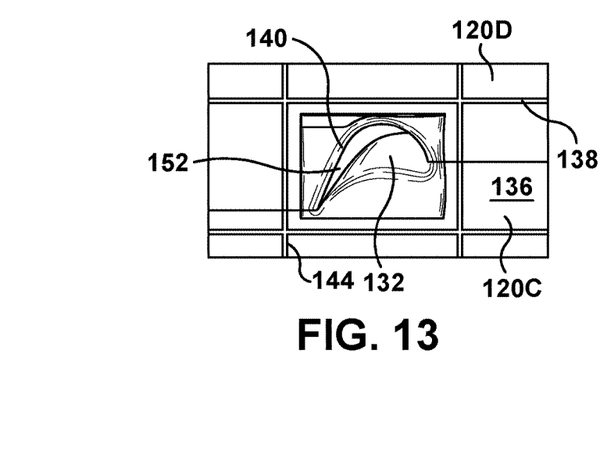
Figure 14:
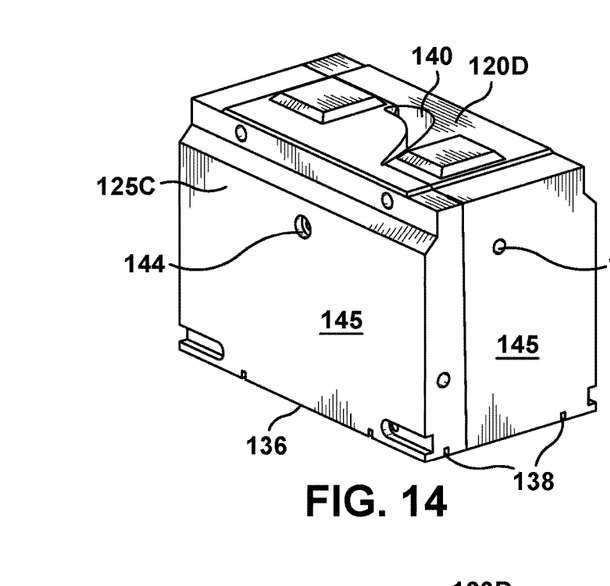
Figure 15:
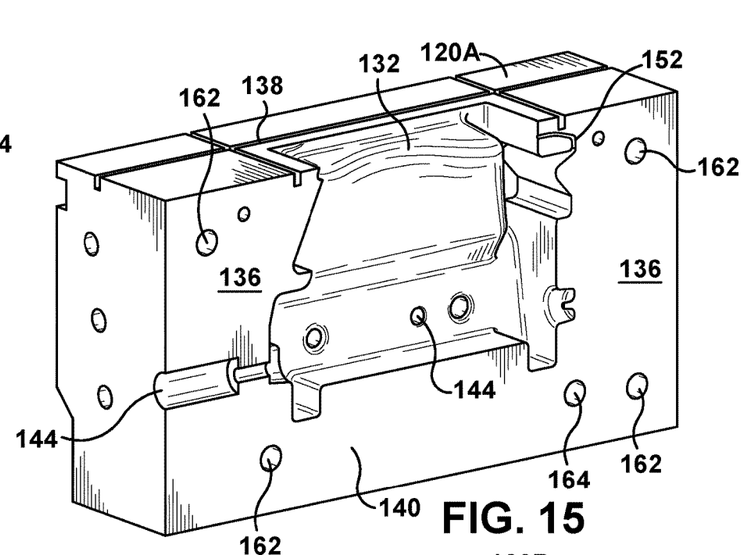
FIGS. 15-18 show varied views of another pair of separable mold portions of a mold system according to embodiments of the disclosure.
Figure 16:
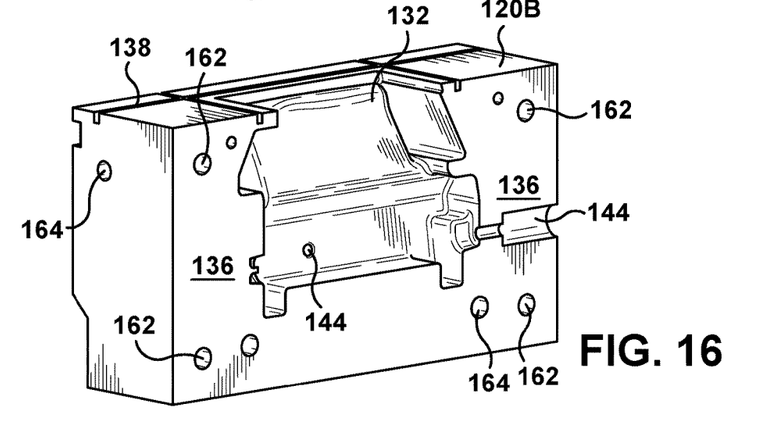
Figure 17:
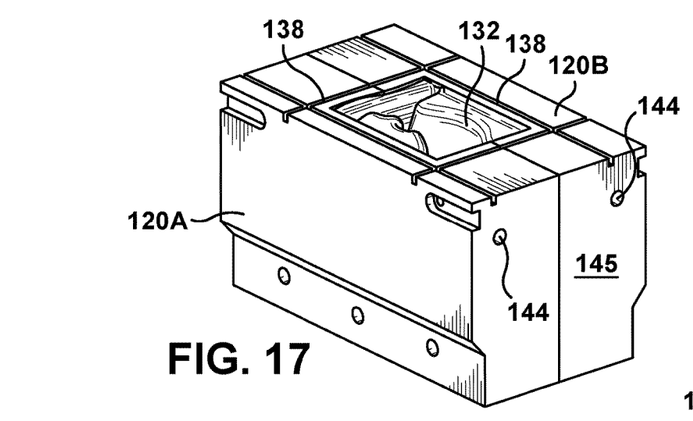
Figure 18:
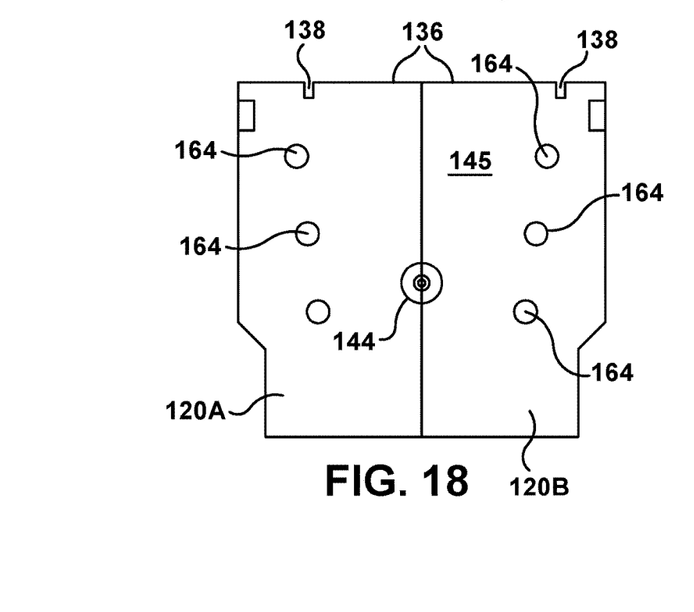

FIGS. 11-14 show various views of selected separable mold portions 120C, 120D from a top portion of mold 110 in FIGS. 1-4, and FIGS. 15-18 show various views of selected separable mold portions 120A, 120B from a bottom portion of mold 110 in FIGS. 1-4. More particularly, FIGS. 11 and 12 show perspective views of mating separable mold portions 120C, 120D; FIG. 13 shows a bottom view of both mold portions 120C, 120D; FIG. 14 shows a perspective view of both mold portions 120C, 120D; FIGS. 15 and 16 show perspective views of mating separable mold portions 120A, 120B; FIG. 17 shows a side view of both mold portions 120A, 120B; and FIG. 18 shows a perspective view of both mold portions 120A, 120B. As illustrated, each separable mold portion 120 may include any structure necessary for sealingly coupling with other mold portions. For example, mold portions 120A-D may include mating surfaces 136 configured to seat and mate with an adjacent mold portion. Surfaces 136 can be any shape necessary to allow mating, e.g., planar and/or curved. Surfaces 136 are dimensioned so as to prevent sacrificial material 130 fluid from passing therethrough when mated. Further, certain mold portion(s) 120A-D may include gasket grooves 138 (FIGS. 13, 15-18) configured to receive a gasket (not shown) therein for sealing with an adjacent mold portion. Further, certain mold portion(s) 120C-D may include ceramic core top-bot fixturing ends 140. Separable mold portions 120A, 120B, 120C, 120D are also designed to be mixed and matched, for example separable mold portions 120A and 120B forming a bottom portion of mold 110 may be common across multiple airfoil designs having differing separable mold portions 120C, 120D that form top portion of mold 110.

Figure 19:
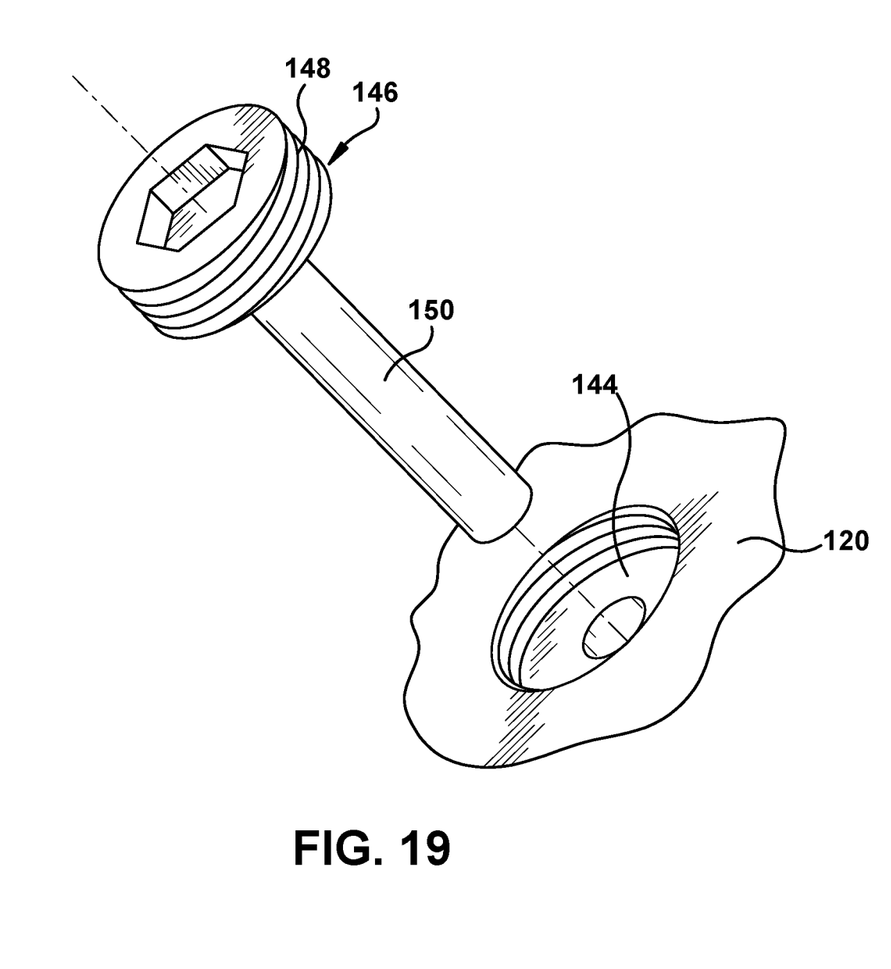
FIG. 19 shows a perspective view of an illustrative core positioner according to one embodiment of the disclosure.

Certain mold portion(s) 120A-D may also include a core positioner receiver 144 therein. Each core positioner receiver 144 is configured to receive a core positioner 146 (FIGS. 2 and 19) therein that extends through a respective mold portion 120 to contact and appropriately position a respective core 112 relative to interior surface 132 of mold 110. That is, position core 112 spaced from an interior surface 132 of mold 110 to define the position and thickness of sacrificial material 130 about the core. Core positioner receivers 144 are thus another feature of each separable mold portion 120 that can be varied to accommodate varied cores 112. Each core positioner receiver 144 may include a hole extending from interior surface 132 of mold 110 to an exterior surface 145 of mold 110, and may include a counter-bore on the external surface of mold 110. Mold system 100 may include a plurality of core positioners 146 (FIG. 2) configured to position the selected core 112 via core positioner receivers 144 in the at least one of the plurality of separable mold portions 120. In one embodiment, each core positioner 146 (FIG. 2) may have a selected length to position a respective portion of a selected core 112 relative to interior surface 132 of mold 110. In this case, a set of core positioners 146 (FIG. 2) may be provided for each mold portion 120 and/or for each varied core 112. In another embodiment, core positioner 146 (FIG. 19) may be adjustable in each core positioner receiver 144 so as to accommodate a variety of mold portions 120 and/or a number of varied cores 112. For example, as shown in FIG. 19, a core positioner 146 may include a head 148 coupled to a rod 150. Head 148 may be threaded so as to mate and adjustably seat in a counter-threaded core positioner receiver 144 in a separable mold portion 120. As head 148 is threadably inserted, the position of rod 150 relative to interior surface 132 changes to accommodate contact with rod 150 with an external surface of different cores 112. Head 148 may include any structure necessary to allow for the adjustment, e.g., a screwdriver head. In this fashion, each adjustable core positioner 146 (FIG. 19) may be configured to position a number of the plurality of varied cores 112 in mold 110.

Returning to FIGS. 11-18, certain separable mold portions, e.g., 120A in FIG. 15, may include air flow path(s) 152 to allow air to exit mold 110. Air flow path(s) 152 may be provided wherever necessary to ensure air removal during operation.

Referring to FIGS. 1, 2 and 14-18, plurality of separable mold portions 120A-D may be fastened together in a number of ways. As shown in FIGS. 1 and 2, fasteners 160 may be used to selectively couple plurality of separable mold portions together, e.g., 120B to 120D and 120A to 120C. Fasteners 160 can take any form to hold mold portions 120A-D together during operation, e.g., external clamps held in position by bolts, seats in mold portions (shown), screws, etc. Certain separable mold portions 120A-D may also include mating fastener holes 162 for receiving a fastener (not shown) therein, e.g., threaded bolt, screw, etc., to selectively fasten mold portions together. For example, as shown in FIGS. 11 and 12, separable mold portions 120C and 120D may include mating fastener holes 162, and as shown in FIGS. 15 and 16, separable mold portions 120A and 120B may include mating fastener holes 162. Mating fastener holes 162 (in one or both separable mold portions being fastened) may include a mechanism to secure the fastener, e.g., mating threads, locking seat, etc. In addition to individual fastening of separable mold portions 120A-D, any now known or later developed mold locking press may be employed to further hold mold 110 together during use.

Mold system 100 also provides mechanisms for controlling a temperature of mold 110. In particular, separable mold portions 120 provide for more precise thermal control than conventional systems. Temperature control of mold 110, and in particular each separable mold portion 120 or a zone including a certain separable mold portion 120 may be desired for a number of reasons. For example, temperature control allows one to: maintain a desired viscosity and/or temperature of sacrificial material fluid, maintain a desired temperature of a core 112, protect mold 110 from overheating damage, and preheat mold 110 to ensure proper casting. Further, certain sacrificial material fluids, e.g., wax or certain polymers, may require a certain temperature to create a fluid form and/or maintain an appropriate temperature for creating casting article 102. As will be described, the temperature control can be customized and controlled in a number of ways according to embodiments of the disclosure.

In one embodiment, as shown for example in FIGS. 11, 12, 15 and 16, each separable mold portion 120A-D may also include a mold thermal conducting conduit 164 therein configured to conduct a temperature controlled thermal fluid therethrough to control a temperature of at least the respective separable mold portion 120. Mold thermal conducting conduits 164 may be deemed "closed loop" because they are arranged to provide a complete path followed by temperature controlled thermal fluid 176 as it is fed from mold thermal fluid controller 180 to input port(s), through the respective portion of mold portion(s) 120A-D and then to output port(s). Temperature controlled thermal fluid 176 used can be any now known or later developed heat conducting fluid, e.g., air, water, antifreeze, etc., appropriate for the mold material. Temperature controlled thermal fluid 176 may add heat to a respective separable mold portion 120A-D, and/or cool it. Temperature controlled thermal fluid 176 may be used to preheat mold 110 and/or maintain a temperature during casting article 102 formation. It is recognized that while temperature controlled thermal fluid 176 passes through a respective separable mold portion 120A-D, it may transfer thermal energy not just to/from the particular mold portion through which it passes but also to neighboring structure, the sacrificial material fluid and/or core 112.

Each varied interchangeable version of the at least one selected separable mold portion 120A-D may include a mold thermal conducting conduit 164 different than the mold thermal conducting conduit in the other separable mold portions of the set. In this manner, each version of a selected separable mold portion 120A-D can have its respective thermal conducting path customized for the situation for which the mold portion is built. For example, as shown in FIG. 9, a certain core 112B may require mold thermal conducting conduits 164 that pass in close proximity to interior surface 132 to maintain the core and/or sacrificial material 130 fluid at a certain desired temperature, e.g., less than 0.5 centimeters. In contrast, as shown in FIG. 10, another core 112B may have mold thermal conducting conduits 164 that do not pass as close to interior surface 132, e.g., greater than 0.5 centimeters. Again, each separable mold portion 120A-D and any mold thermal conducting conduits 164 therein can be customized for the expected situation for which it was built. The customization of mold thermal conducting conduits 164 can take any form including but not limited to: conduit number, cross-sectional area, length, shape, position/path, etc., and temperature controlled thermal fluid temperature, type, flow rate, etc.

Figure 20:
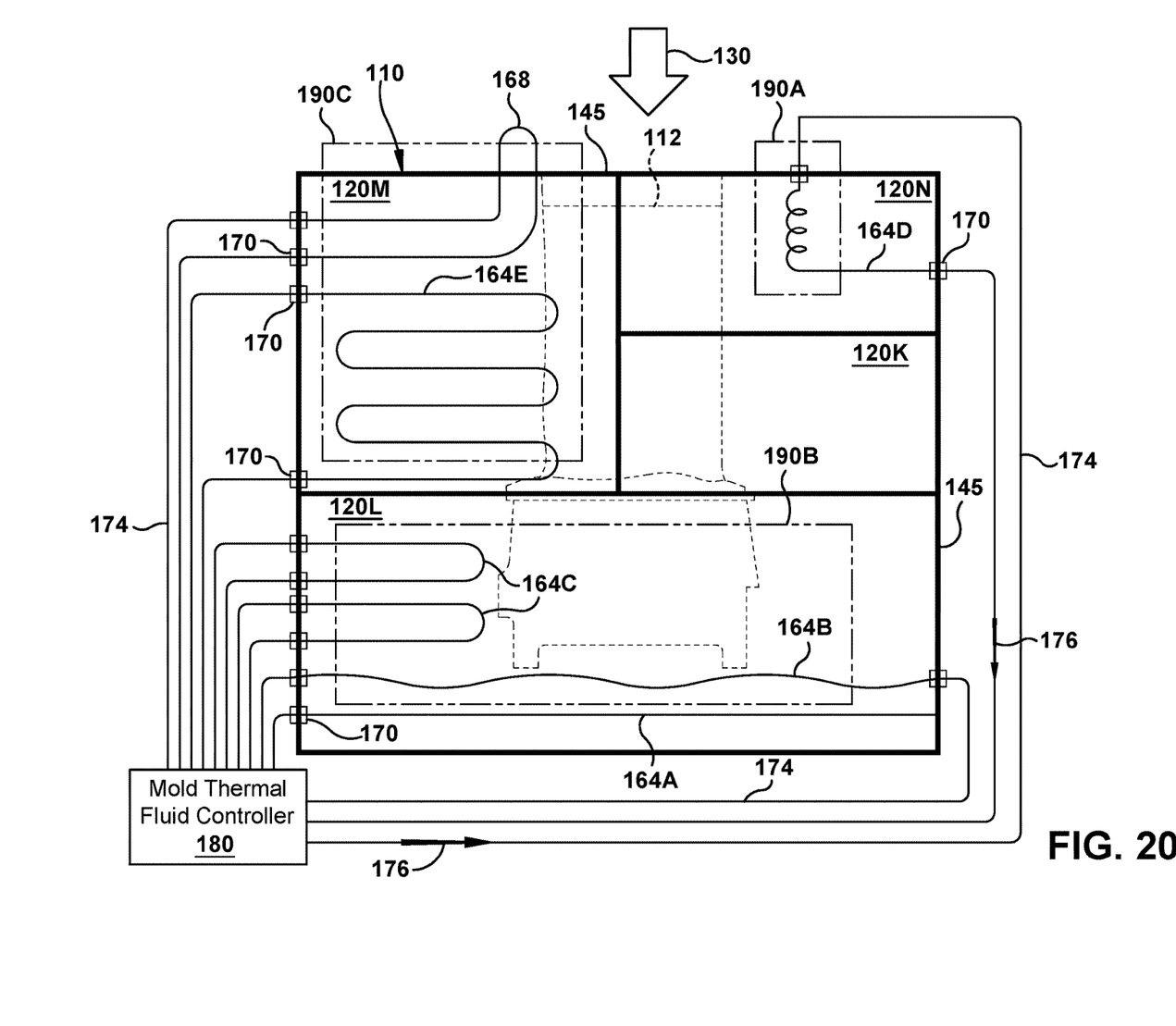
FIG. 20 shows a schematic, cross-sectional view of an illustrative mold system including a mold thermal fluid controller for delivering temperature controlled thermal fluid to mold thermal conducting conduits in the mold, and showing varied mold thermal conducting conduit paths and positions according to various embodiments of the disclosure.

FIG. 20 shows a schematic, cross-sectional view of a mold 110 including various mold thermal conducting conduits 164A-E illustrating example paths and/or positions at which they can be employed. As shown in FIG. 20, mold thermal conducting conduit(s) 164A-E (collectively "mold thermal conducting conduits 164") may take any path through a respective mold portion including but not limited to: straight line 164A, curved line 164B, loop(s) 164C, helical or spiral 164D, sinusoidal 164E, etc. As also shown in FIG. 20, not all separable mold portions 120 need include a mold thermal conducting conduit, e.g., portion 120K is devoid of conduits. As also shown in FIG. 20, external mold thermal conducting conduit(s) 168 may also be provided to route conduit paths on exterior surface 145 of, e.g., mold portion(s) 120M. Any now known or later developed ports 170 can be provided on exterior surface 145 of mold portion(s) 120 for fluidly coupling to external conduits 174 (one example shown in FIG. 20) that fluidly communicate with a mold thermal fluid controller 180 configured to control a temperature of each of the plurality of separable mold portions 120K-N or a zone including a portion of selected separable mold portions.

Mold thermal fluid controller 180 can include any now known or later developed temperature controlled thermal fluid temperature control system for creating any number of temperature controlled thermal fluid 176 flows, each at a specific temperature, e.g., a multi-tiered heat exchanger such as Thermolator TW Series water temperature control unit. Any necessary pumps to move temperature controlled temperature controlled thermal fluid 176 may also be provided. Mold thermal conducting conduits 164 can be arranged to control the temperature of a particular separable mold portion 120 and/or a sacrificial material fluid input zone 190. With regard to the zones, one or more mold thermal conducting conduit(s) 164 may act to control a temperature of a defined sacrificial material fluid input zone 190A-C (3 shown). Each zone 190A-C is configured to receive a sacrificial material fluid to form a sacrificial material about the core at a particular temperature. Each zone 190A-C can be defined by, for example, any desired area and/or volume of mold 110, any area and/or volume of the void to be filled by sacrificial material 130 fluid, and/or any area and/or volume of core 112. Each separable mold portion 120A-C may include at least one sacrificial material fluid input zone 190A-C, i.e., zones do not necessarily match mold portions.

At least one separable mold portion 120 can have temperature controlled thermal fluid 176 passing therethrough having a temperature different than another separable mold portion 120. Similarly, each zone 190A-C can have temperature controlled thermal fluid 176 passing through or near in such a way as to have a temperature different than another zone. In any event, a mold thermal conducting conduit 164 may control a temperature of at least the sacrificial material 130 fluid within at least one respective separable mold portion 120, and perhaps other areas such as those downstream of the mold portion in which the conduit exists. Each zone 190A-C, for example, can have a temperature controlled therein to control, for example, the viscosity and other flow characteristics of sacrificial material 130 fluid in the respective zone to accommodate any casting/injection issues specific to that zone including but not limited to: difficult wetting/flow conditions, and/or core 112 issues. For example, the temperature of a zone 190A-C can be controlled based on a characteristic of core 112, e.g., fragility, difficult wetting, etc., in the respective zone. In this manner, core 112 damage and sacrificial material fluid flow can be readily controlled, and quality casting article 102 formation can be attained. Further, certain mold 110 materials may require using sacrificial material fluid having a certain maximum temperature that does not damage the mold, e.g., a PMMA mold. Each zone 190A-C temperature can also be controlled to prevent mold damage by sacrificial material fluid overheating. The temperature of each mold portion 120 can be similarly controlled.

Figure 21:
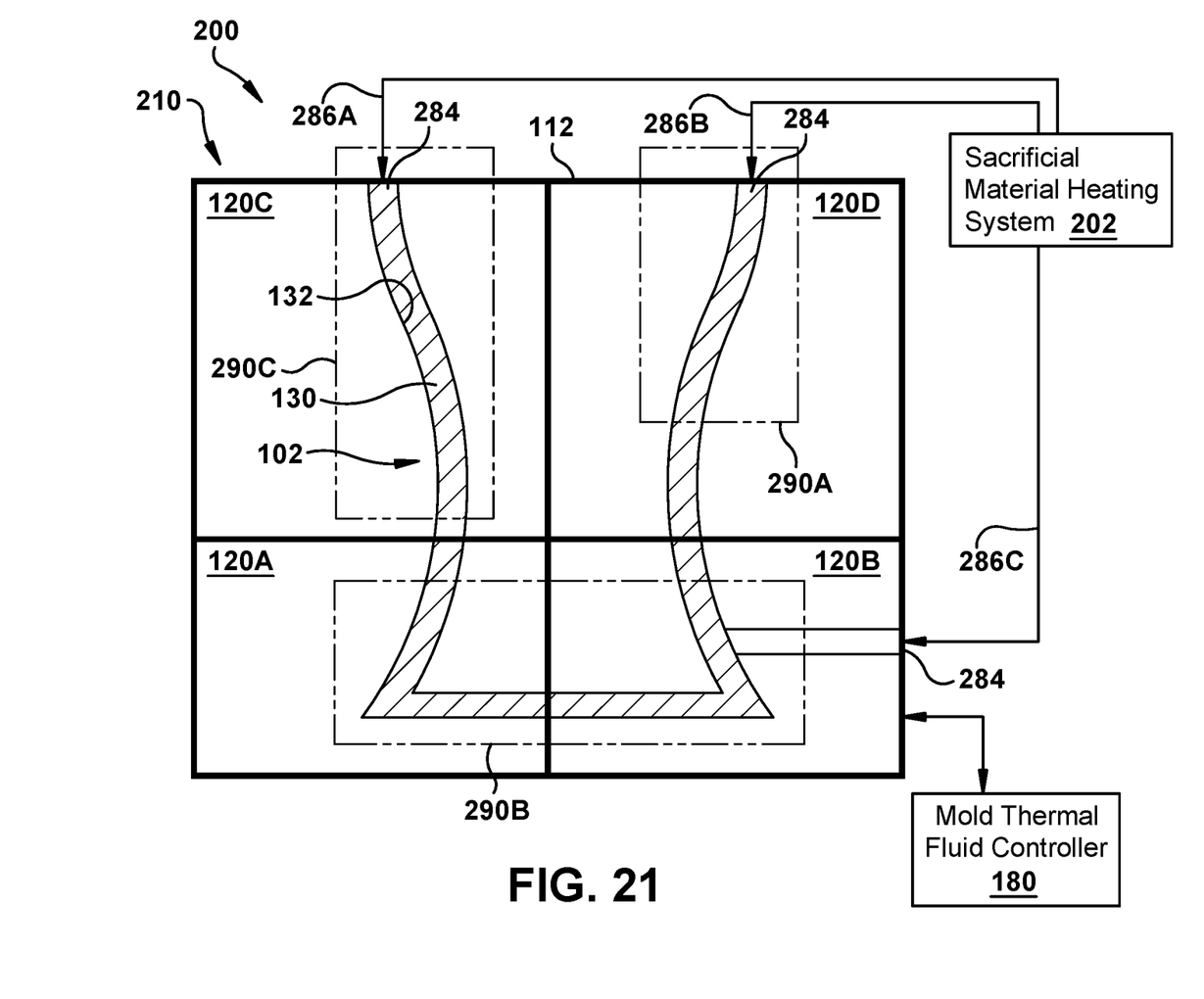
FIG. 21 shows a schematic, cross-sectional view of an illustrative mold system including a sacrificial material heating system according to various embodiments of the disclosure.

Turning to FIG. 21, a schematic cross-sectional view of a mold system 200 according to a further embodiment of the disclosure is illustrated. Mold system 200 may be substantially similar to mold system 100 as described herein. For example, mold system 200 includes a mold 210 for receiving therein core 112, and mold 210 includes plurality of separable mold portions 120A-D that are coupleable together to create the mold and configured to form the sacrificial material from the sacrificial material fluid about the core. Further, a selected separable mold portion, e.g., 120E, F (FIGS. 9-10), of the plurality of separable mold portions 120 includes a set of varied interchangeable versions of the at least one selected separable mold portion. Each varied interchangeable version of the selected separable mold portion 120 may be configured to accommodate a different core 112 of a plurality of varied cores. In the FIG. 21 embodiment, however, mold system 200 may have more than one sacrificial material fluid input 284 thereto for receiving more than one sacrificial material fluid flow 286A-C. For example, each separable mold portion 120 may have one or more sacrificial material fluid inputs 284. Also, some separable mold portions 120 may be devoid of sacrificial material fluid inputs, e.g., portion 120A in the example of FIG. 21.

In addition, mold system 200 may also include a sacrificial material fluid heating system 202 to control the temperature and viscosity of sacrificial material 130 fluid, and indirectly control the temperature of mold portions 120. Sacrificial material heating system 202 can operate alone or in addition to mold thermal fluid controller 180 (latter shown in simpler fashion in FIG. 21 than in FIG. 20 for clarity). Sacrificial material fluid temperature control can be made based on separable mold portions 120 and/or zones. Regarding zones, mold system 200 may include plurality of sacrificial material fluid input zones 290A-C configured to receive a sacrificial material fluid 286A-C flows to form a sacrificial material 130 about the core. One or more sacrificial material inputs 284A-C alone or in conjunction with mold thermal conducting conduits 164A-E (FIG. 20) may act to control a temperature of a sacrificial material fluid input zone 290A-C (3 shown) configured to receive a sacrificial material fluid to form a sacrificial material about the core. As noted, each zone 290A-C can be defined by, for example, any desired area and/or volume of mold 210, any area and/or volume of the void to be filled by sacrificial material fluid, and/or any area and/or volume of core 112. Each separable mold portion 120A-D may include at least one sacrificial material fluid input zone 290A-C. Each zone 290A-C can have a temperature of sacrificial material fluid injected therein (and/or temperature controlled thermal fluid sent therethrough) controlled to control, for example, the viscosity and other flow characteristics of sacrificial material 130 fluid in the respective zone to accommodate any injection issues therein including but not limited to: difficult wetting/flow conditions, and/or core 112 issues. The temperature of the sacrificial material fluid received in each sacrificial material fluid input zone 290A-C may be based on, for example, a characteristic of core 112, e.g., fragility, difficult wetting, etc., in the respective sacrificial material input zone. Sacrificial material 130 fluid flows 286A-C can also be controlled based on the separable mold portions 120A-D into which they are injected.

Sacrificial material fluid heating system 202 may include any now known or later developed sacrificial material heating unit(s) for creating a sacrificial material fluid flows 286A-C at a specific temperature, e.g., a multi-tiered heat exchanger, or a series of heating units. In the latter example, for use with wax, heating system 202 may include a series of Dura-Bull air pressure wax injectors, each creating fluid wax at a different temperature. In any event, sacrificial material fluid heating system 202 may be configured to heat a plurality of flows 286A-C of the sacrificial material fluid to different temperatures. That is, each sacrificial material fluid flow 286A-C may have a different temperature as controlled by sacrificial material fluid heating system 202. In this manner, one sacrificial material fluid input zone 290A may receive one of the plurality of flows of the sacrificial material fluid flows 286A at a first temperature, and another sacrificial material fluid input zone 290B receives another sacrificial material fluid flow 286B at a second, different temperature. Alternatively, one separable mold portion 120C may receive one of sacrificial material fluid flow 286A at a first temperature, and another separable mold portion 120B may receive another sacrificial material fluid flow 286C at a second, different temperature. The temperatures can be selected to address any of the afore-mentioned reasons for having temperature control.

Figure 22:
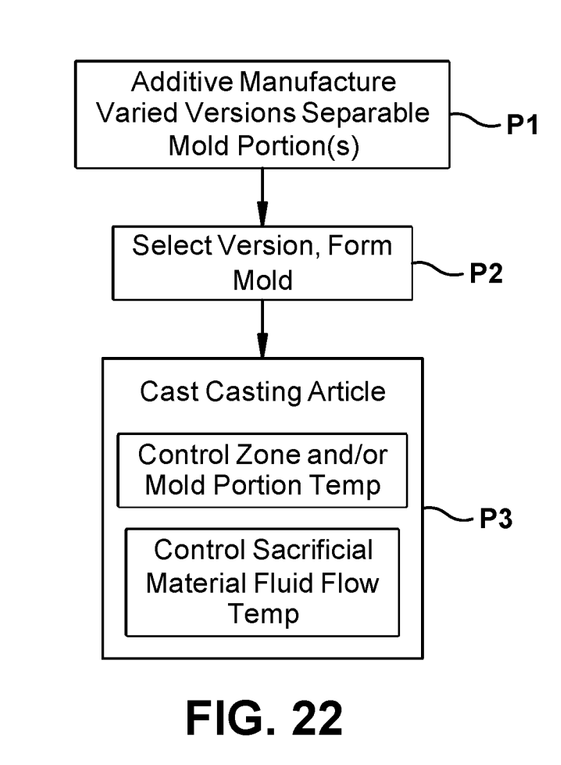
FIG. 22 shows a flow diagram illustrating methods according to various embodiments of the disclosure.

In operation, as shown in the flow diagram of FIG. 22, a method of forming casting article 102 for investment casting according to embodiments of the disclosure may include, in process P1, having a plurality of separable mold portions 120 for mold 110 for forming casting article 102 additively manufactured, e.g., by DMLM, stereolithography, etc. As noted, plurality of mold portions 120A-D may include a set of varied interchangeable versions of a selected separable mold portion, e.g., 120A, 120B, 120C or 120D (FIGS. 1-2), or 120K, 120L, 120M or 120N (FIG. 20). Each varied interchangeable version of the selected separable mold portion 120 may be configured to accommodate a different core 112 of a plurality of varied cores (FIGS. 9, 10).

As described, as shown in process P2, mold 110 may be formed about a selected core 112 of the plurality of varied cores 112 by coupling two or more mold-selected separable mold portions 120 together. The mold-selected separable mold portions, i.e., those from the set(s) selected to be used in mold 110, are selected to accommodate the selected core of the plurality of varied cores. Each separable mold portion 120 may include a mold thermal conducting conduit 164 therein configured to conduct temperature controlled thermal fluid 176 (FIG. 20) therethrough to control a temperature of at least the respective separable mold portion, or a zone 190 in the mold. Mold 110 formation may include fastening the two or more mold-selected separable mold portions together using fasteners 160. Mold 110 formation may also include positioning selected core 112 in mold 110 using a core positioner receiver 144 in at least one of the plurality of separable mold portions. The positioning may include using a plurality of core positioners 146 (FIG. 2) configured to position selected core 112 via core positioner receiver 144 in the at least one of the plurality of separable mold portions 120. That is, selecting which from a plurality of positioners 146 (FIG. 2) work for a particular core 112. Alternatively, the positioning may include using an adjustable core positioner 146 (FIG. 19) in each core positioner receiver 144. Each adjustable core positioner 146 is configured to position a number of the plurality of varied cores 112 in the mold.

Once mold 110 is formed, in process P3, casting article 102 can be casted by introducing a sacrificial material 130 fluid into the mold and about the selected core. Process P3 may further include controlling a temperature of a plurality of sacrificial material fluid input zones 190A-C (FIG. 20), 290A-C (FIG. 21) in mold 110, 210, respectively. Each zone is defined to receive the sacrificial material 130 fluid to form a sacrificial material about the core that is positioned within the mold at a particular temperature. Temperature of each separable mold portion 120A-D (FIGS. 1-2) may also be controlled. As shown in FIG. 22, process P3 may include controlling a temperature of each of the plurality of separable mold portions and/or zones, e.g., using mold thermal fluid controller 180 alone. Alternatively, as shown in FIG. 22, process P3 may include heating a plurality of flows 286A-C (FIG. 21) of the sacrificial material fluid to different temperatures, e.g., using sacrificial material fluid heating system 202, and directing one of the plurality of flows of the sacrificial material fluid, e.g., 286C, at a first temperature to a first sacrificial material input zone 290C of the mold, and directing another of the plurality of flows of sacrificial material fluid, e.g., 286B, at a second, different temperature to a second, different sacrificial material fluid input zone 290B. Alternatively, process P3 may include directing one of the plurality of flows of the sacrificial material fluid, e.g., 286B, at a first temperature to a first separable mold portion 120D of the mold, and directing another of the plurality of flows of sacrificial material fluid, e.g., 286C, at a second, different temperature to a second, different separable mold portion 120B. Process P3 may also include using mold thermal fluid controller 180 to control zone(s) 190A-C temperature, and sacrificial material fluid heating system 202 to control sacrificial material fluid temperature in zone(s) 290A-C. Zones 190A-C as defined for controller 180, and zones 290A-C as defined for system 202 can be, but do not need to be, identical.

Once casting article 102 is formed, mold 110 may be removed in any now known or later developed fashion, e.g., by unfastening mold portions 120. As described, casting article 102 can be used in any now known or later developed investment casting process.

Mold systems 100, 200 as described herein provide a number of advantages compared to conventional systems. Mold systems 100, 200 allow for lower pressure sacrificial material fluid injection, e.g., 34.5 kiloPascals (kPa) to 344.5 kPa (5-50 psi), compared to conventional systems, e.g., at or above 13.8 megaPascals (MPa). Mold systems 100, 200 also allow for injection at optimized sacrificial material fluid temperatures and viscosities since the molds have their own respective temperature control. The optimized sacrificial fluid temperatures and viscosities and injection pressures prevent mold 110, 210 and core 112 damage due to thermal and pressure stresses. Mold systems 100, 200 also provides modular and customizable molds to handle a variety of cores. Separable mold portions 120 can be reused, as necessary. Mold thermal fluid controller 180 can be used to pre-heat molds 110, 210 directly and cores 112 indirectly, which aids in improving the quality of casting article 102. Mold thermal fluid controller 180 also allows for precise temperature control of defined zones and/or separable mold portions to address injection issues specific to that zone, mold portion and/or the core portion located therein. Similarly, sacrificial material fluid heating system 202 allows for precise temperature control of sacrificial material fluid uses for a defined zones and/or separable mold portions to address injection issues specific to that zone, mold portion and/or the core portion located therein. The teachings of the disclosure can be used across wide variety of mold materials, and mold manufacturing processes. Fleets of molds can be created to handle wide variations in cores and/or different components to be built. The ability to use additive manufacturing for both mold 110, 210 and cores 112 provides significant time-savings and cost savings compared to conventional casting processes. Further, additive manufacturing allows for issues discovered during formation of the casting article, e.g., core cracking, to be more quickly remedied, and also allows for the issues to be addressed earlier in the overall process, i.e., during the casting article formation rather than during the investment casting process.

The foregoing drawings show some of the processing associated according to several embodiments of this disclosure. In this regard, each block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A mold system for forming a casting article for investment casting of a component, the casting article including a core surrounded by a sacrificial material, the mold system comprising:
    a mold for receiving therein the core;
    at least one core positioner for positioning the core within the mold;
    a space formed between an exterior surface of the core and an interior surface of the mold by the at least one core positioner, the space between the exterior surface of the core and the interior surface of the mold defining a shape of the component for the investment casting;
    a sacrificial material fluid, wherein the sacrificial material fluid comprises a wax or a polymer;
    the mold including a plurality of sacrificial material fluid input zones configured to receive the sacrificial material fluid to form the sacrificial material about the core in the shape of the component for the investment casting;
    a sacrificial material heating system configured to heat a plurality of flows of the sacrificial material fluid to different temperatures,
    wherein at least one of the plurality of sacrificial material fluid zones includes at least one sacrificial material fluid input for depositing the sacrificial material fluid into the space formed between the mold and the core to fill the space formed between the exterior surface of the core and the interior surface of the mold with the sacrificial material, the sacrificial material fluid when solidified forming the sacrificial material about the core, and
    wherein one sacrificial material fluid input zone receives one of the plurality of flows of the sacrificial material fluid heated to a first temperature by the sacrificial material heating system and another sacrificial material fluid input zone receives another of the plurality of flows of the sacrificial material fluid heated to a second, different temperature by the sacrificial material heating system.

2. The mold system of claim 1, wherein the mold includes a plurality of separable mold portions that are coupleable together to create the mold and configured to form the sacrificial material from the sacrificial material fluid about the core, wherein each separable mold portion includes at least one sacrificial material fluid input zone.

3. The mold system of claim 2, wherein a selected separable mold portion of the plurality of separable mold portions includes a set of varied interchangeable versions of the at least one selected separable mold portion, each varied interchangeable version of the selected separable mold portion configured to accommodate a different core of a plurality of varied cores.

4. The mold system of claim 3, wherein each varied interchangeable version of the at least one selected separable mold portion includes at least one of a different: mold opening shape, mold opening size, length, width, height, coefficient of thermal expansion or material.

5. The mold system of claim 1, wherein the temperature of the sacrificial material fluid received in each sacrificial material fluid input zone is based on a characteristic of the core in the respective sacrificial material input zone.

6. A mold system for forming a casting article for investment casting of a component, the casting article including a core surrounded by a sacrificial material, the mold system comprising:
    a mold for receiving therein the core;
    at least one core positioner for positioning the core within the mold;
    a space formed between an exterior surface of the core and an interior surface of the mold by the at least one core positioner, the space between the exterior surface of the core and the interior surface of the mold defining a shape of the component for the investment casting;
    a sacrificial material fluid, wherein the sacrificial material fluid comprises a wax or a polymer;
    the mold including a plurality of separable mold portions that are coupleable together to create the mold and configured to form the sacrificial material about the core from the sacrificial material fluid, wherein each separable mold portion includes a mold thermal conducting conduit therein configured to pass a temperature controlled thermal fluid therethrough to control a temperature of at least the sacrificial material fluid within the respective separable mold portion;
    a thermal fluid controller controlling a temperature of the temperature controlled thermal fluid passing through each of the plurality of separable mold portions, at least one separable mold portion having the temperature controlled thermal fluid passing therethrough having a temperature different than another separable mold portion; and
    at least one sacrificial material fluid input for depositing the sacrificial material fluid into the space formed between the exterior surface of the core and the interior surface of the mold to fill the space formed between the exterior surface of the core and the interior surface of the mold with the sacrificial material, the sacrificial material fluid when solidified forming the sacrificial material about the core.

7. The mold system of claim 6, wherein at least one selected separable mold portion of the plurality of separable mold portions includes a set of varied interchangeable versions of the at least one selected separable mold portion, each varied interchangeable version of the selected separable mold portion configured to accommodate a different core of a plurality of varied cores.

8. The mold system of claim 7, wherein each varied interchangeable version of the at least one selected separable mold portion includes a mold thermal conducting conduit different than the mold thermal conducting conduit in the other separable mold portions of the set.

9. The mold system of claim 7, wherein each varied interchangeable version of the at least one selected separable mold portion includes at least one of a different: mold opening shape, mold opening size, length, width, height, coefficient of thermal expansion or material.

10. The mold system of claim 7, wherein the temperature of the sacrificial material fluid received in each separable mold portion is based on a characteristic of the core in the respective separable mold portion.

\* \* \* \* \*